US009246320B2

(12) United States Patent
Yamada et al.

(10) Patent No.: US 9,246,320 B2
(45) Date of Patent: Jan. 26, 2016

(54) MOTOR-DRIVEN COMPRESSOR (75) Inventors: Tetsuya Yamada, Aichi-ken (JP); Ken Suitou, Aichi-ken (JP); Shingo Enami, Aichi-ken (JP); Akio Fujii, Aichi-ken (JP)

(73) Assignee: KABUSHIKI KAISHA TOYOTA JIDOSHOKKI, Aichi-ken (JP)

( * ) Notice: Subject to any disclaimer, the term of this patent is extended or adjusted under 35 U.S.C. 154(b) by 1005 days.

(21) Appl. No.: 13/251,425

(22) Filed: Oct. 3, 2011

(65) Prior Publication Data

US 2012/0087811 A1     Apr. 12, 2012

(30) Foreign Application Priority Data

Oct. 7, 2010   (JP) ................................. 2010-227826

(51) Int. Cl.
| H02G 15/013 | (2006.01) |
| F04B 35/04 | (2006.01) |
| F04B 39/12 | (2006.01) |
| F04C 23/00 | (2006.01) |
| F04C 18/02 | (2006.01) |

(52) U.S. Cl.
CPC .............. *H02G 15/013* (2013.01); *F04B 35/04* (2013.01); *F04B 39/12* (2013.01); *F04B 39/121* (2013.01); *F04C 23/008* (2013.01); F04C 18/0215 (2013.01); F04C 2240/803 (2013.01)

(58) Field of Classification Search
CPC ........ F04B 39/121; F04B 35/04; F04B 39/12; F04C 23/008; F04C 2270/12; F04C 2240/30; F04C 2240/808; F04C 2240/803; F04C 18/0207–18/0215; F04C 18/0223; F04C 23/08; H02G 15/013
USPC ..................... 417/410.1, 423.14, 902, 410.5; 439/271–283
See application file for complete search history.

(56) References Cited

U.S. PATENT DOCUMENTS

| 4,592,955 | A | * | 6/1986 | Choi et al. ..................... 428/389 |
| 4,966,559 | A | * | 10/1990 | Wisner .......................... 439/566 |
| 4,984,973 | A | | 1/1991 | Itameri-Kinter et al. |

(Continued)

FOREIGN PATENT DOCUMENTS

| EP | 2 039 932 A1 | 3/2009 |
| JP | 05-256261 A | 10/1993 |

(Continued)

OTHER PUBLICATIONS

Extended European Search Report for corresponding EP Patent Application No. 11183921.3 dated Jan. 16, 2012. considered in view of TRAN.LET Dec. 6, 2013.

*Primary Examiner* — Devon Kramer
*Assistant Examiner* — Joseph Herrmann
(74) *Attorney, Agent, or Firm* — Sughrue Mion, PLLC (57) ABSTRACT A motor-driven compressor includes a shell, an electric motor, a first conductor electrically connected to an external power source, a second conductor electrically connected to the electric motor, a connector connecting the first conductor and the second conductor and a connector case. The connector case has a first case member, a second case member, a first and a second seal members interposed between the first and the second case members, a hole through which the first conductor is inserted and a third seal member sealing between the first conductor and the connector case. A first main seal of the first seal member and a second main seal of the second seal member cooperate to form a cylindrical seal portion for sealing the second conductor that is inserted through the cylindrical seal portion when the first and the second seal members are joined.

10 Claims, 11 Drawing Sheets

(56) References Cited

U.S. PATENT DOCUMENTS

| | | | |
|---|---|---|---|
| 5,131,858 A * | 7/1992 | Heimbrock | 439/181 |
| 7,344,408 B2 * | 3/2008 | Kato et al. | 439/578 |
| 2006/0068626 A1 * | 3/2006 | Hasegawa | F04C 29/0085 439/276 |
| 2009/0315417 A1 | 12/2009 | Taguchi et al. | |
| 2011/0243769 A1 | 10/2011 | Yamada et al. | |

FOREIGN PATENT DOCUMENTS

| | | |
|---|---|---|
| JP | 05-091995 U | 12/1993 |
| JP | 2005-044579 A | 2/2005 |
| JP | 2005-146951 A | 6/2005 |
| JP | 2010-065625 A | 3/2010 |
| JP | 2011-211876 A | 10/2011 |

* cited by examiner

MOTOR-DRIVEN COMPRESSOR

BACKGROUND OF THE INVENTION

The present invention relates to a motor-driven compressor having a shell receiving therein an electric motor that is electrically connected to a power source located outside the shell.

In such kind of compressor, a first conductor connected to the power supply extends through the shell, and a second conductor connected to the electric motor is connected to the first conductor in the shell.

When the compressor is left stopped for a long time, refrigerant gas existing in the compressor or within the shell may be cooled and liquefied, and such liquefied refrigerant may remain in the compressor. Although major part of the second conductor is covered by an insulator, immersion of the connection between the first and the second conductors in the liquid refrigerant may cause electrical leakage between the first and the second conductors.

In the compressor disclosed in Japanese Unexamined Patent Application Publication NO. 05-256261, the second conductor or a motor lead wire is connected to a spring terminal, and part of the first conductor that is located in the shell is inserted in the spring terminal and electrically connected to the spring terminal. The spring terminal is covered by a heat-shrinkable tube in the shell. The tube shrinks when heated by operation of the compressor, thereby preventing contact between the conductors and liquid refrigerant in the shell.

However, sealing provided by the shrinkage of the tube is not enough to prevent electrical leakage in the shell. Good sealing may be accomplished, for example, by covering the spring terminal using thermosetting resin such as epoxy resin and then setting the resin by heating. However, this procedure is troublesome.

The present invention is directed to providing a motor-driven compressor that provides improved and simple sealing of electrical connection between a first and a second conductors in a shell of the compressor.

SUMMARY OF THE INVENTION

A motor-driven compressor includes a shell, an electric motor provided in the shell, a first conductor extended through the shell and electrically connected to an external power source, a second conductor electrically connected to the electric motor, a connector connecting the first conductor and the second conductor and a connector case receiving the connector. The connector case has a first case member including a first seal surface extending along the periphery of the first case member, a second case member including a second seal surface extending along the periphery of the second case member and facing the first seal surface, a first seal member interposed between the first and second case members and having a first main seal that is joined to the first seal surface, a second seal member interposed between the first and second case members and having a second main seal that is joined to the second seal surface, a hole through which the first conductor is inserted and a third seal member provided in the connector case and sealing between the first conductor and the connector case. The first main seal and the second main seal cooperate to form a cylindrical seal portion for sealing the second conductor that is inserted through the cylindrical seal portion when the first and the second seal members are joined.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
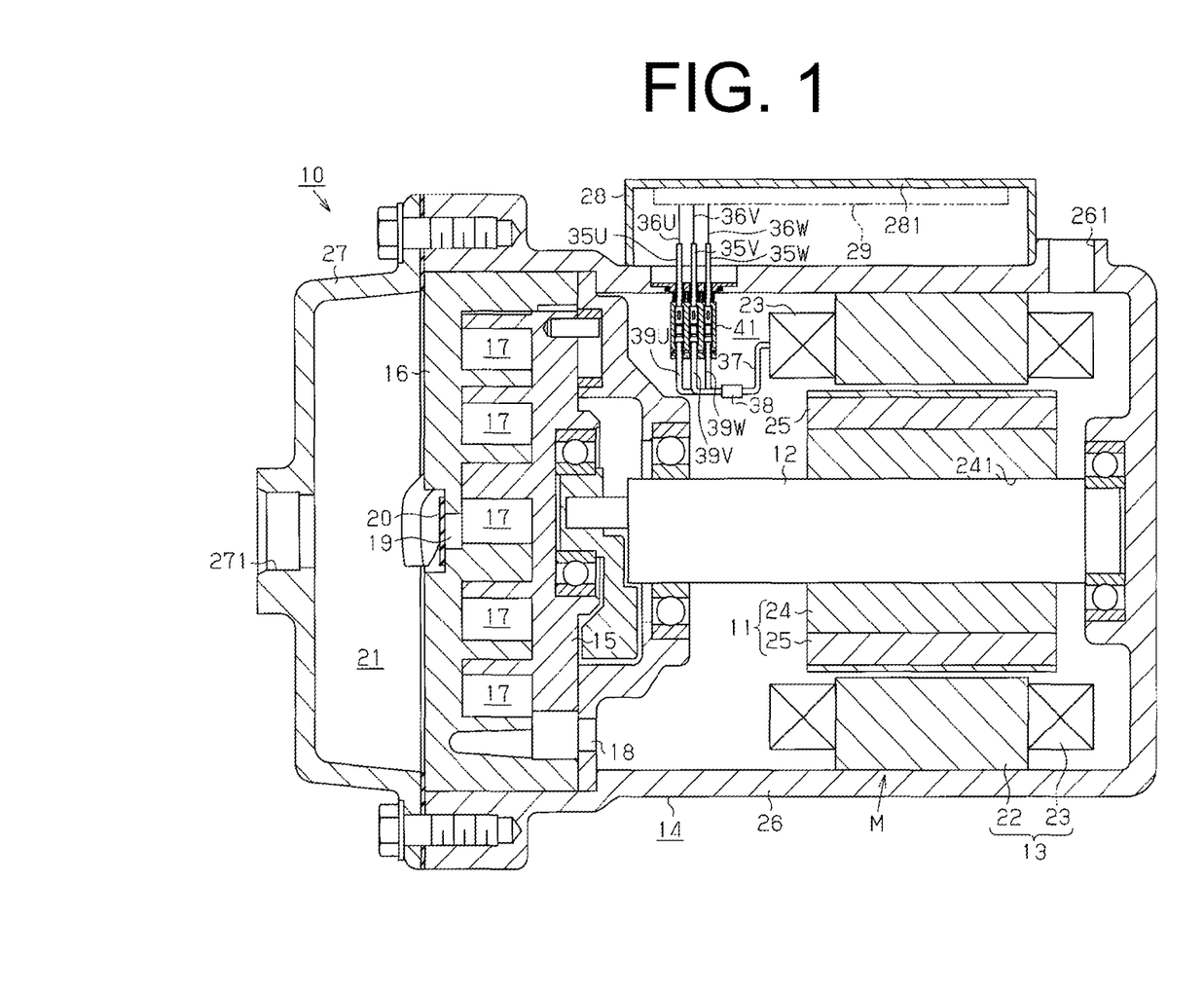
FIG. 1 is a longitudinal sectional view of a motor-driven compressor according to a first embodiment of the present invention.

The following will describe the first embodiment of the motor-driven compressor according to the present invention with reference to FIGS. 1 through 8. Referring to FIG. 1, the scroll-type motor-driven compressor designated generally by 10 has a generally cylindrical shell 14 receiving therein an electric machine or an electric motor M. The shell 14 is composed of a motor housing 26 and a front housing 27 connected to the front end of the motor housing 26.

The electric motor M includes a rotary shaft 12, a rotor 11 fixedly mounted on the rotary shaft 12 and a stator 13 fixed on the inner peripheral surface of the motor housing 26. The compressor 10 has a movable scroll 15 and a fixed scroll 16 cooperating to form therebetween compression chambers 17. The movable scroll 15 makes an orbital motion relative to the fixed scroll 16 by the rotation of the rotary shaft 12 so that the volumes of the compression chambers 17 are varied.

The motor housing 26 has formed therethrough an inlet port 261 through which refrigerant gas is introduced from an external refrigerant circuit (not shown) into the motor housing 26. Refrigerant gas introduced into the motor housing 26 is flowed into the compression chamber 17 through a passage (not shown) between the inner peripheral surface of the motor housing 26 and the outer peripheral surface of the stator 13 and then a suction port 18 with the revolution of the movable scroll 15. The compressed refrigerant gas is discharged out from the central compression chamber 17 into a discharge chamber 21 formed in the front housing 27 through a discharge port 19 while pushing open a discharge valve 20, with the revolution of the movable scroll 15. The refrigerant gas flows out of the discharge chamber 21 through an outlet port 271 of the front housing 27 into the external refrigerant circuit, through which the refrigerant gas flows back into the motor housing 26.

The stator of the electric motor M is composed of a ring-shaped stator core 22 and a coil 23 wound around the stator core 22. The rotor 11 of the electric motor M is composed of a rotor core 24 and plural permanent magnets 25 embedded in the rotor core 24. The rotor core 24 has formed therethrough a central hole 241 through which the rotary shaft 12 is inserted and fixed.

A cover 28 is provided on the outer peripheral surface of the motor housing 26. An inverter 29 as an external power source is mounted on the inner surface of the upper wall 281 of the cover 28. Part of the motor housing 26 that is covered with the cover 28 has formed therethrough a hole 30.

Figure 2:
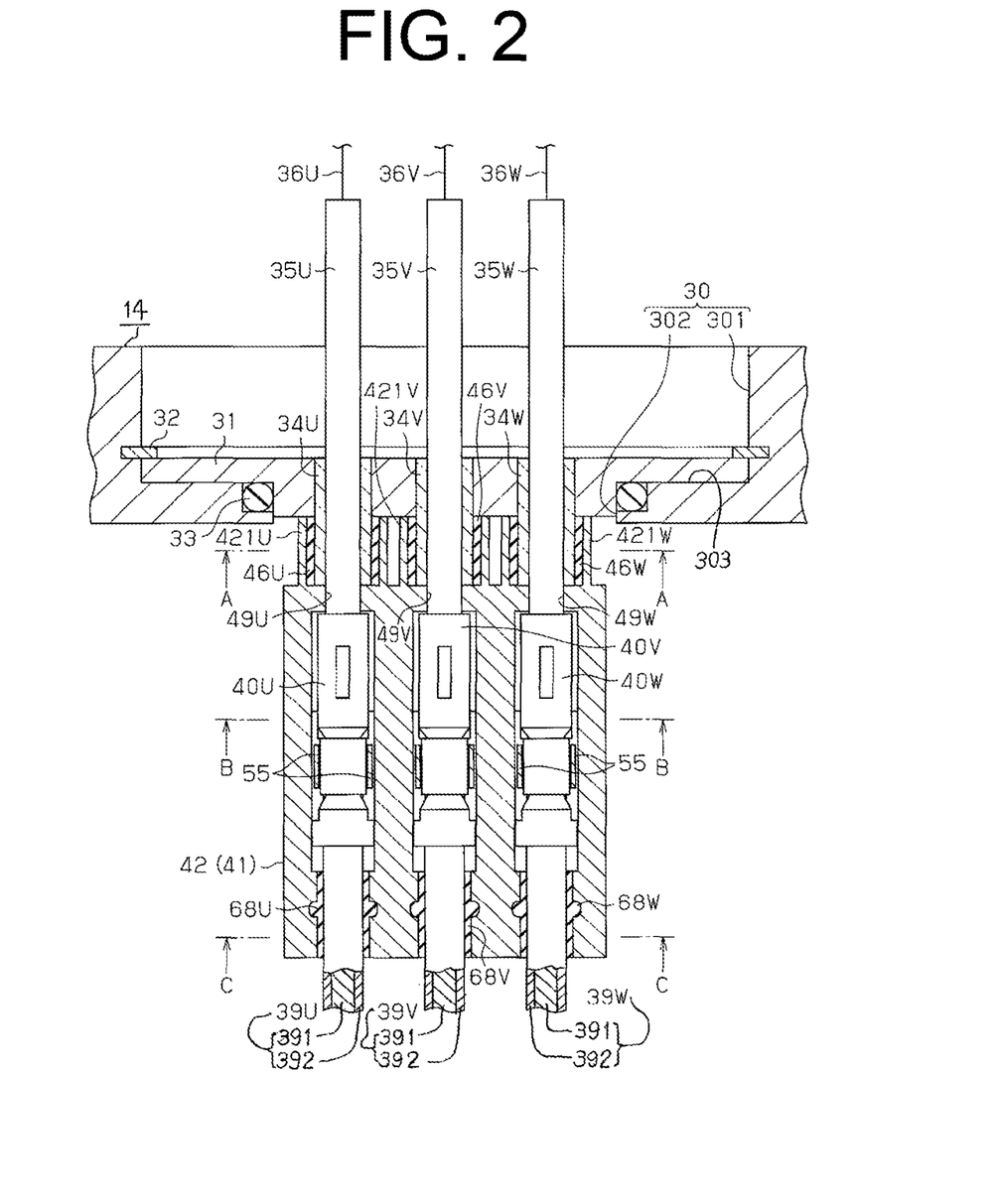
FIG. 2 is an enlarged fragmentary sectional view of the compressor of FIG. 1.

Referring to FIG. 2, the hole 30 is stepped, having a large-diameter portion 301 located on the side adjacent to the outer peripheral surface of the motor housing 26, a small-diameter portion 302 located on the side adjacent to the inner peripheral surface of the motor housing 26 and a step 303 located between the large-diameter portion 301 and the small-diameter portion 302. A base 31 and a circlip 32 are provided in the large-diameter portion 301. The base 31 is placed on the step 303 and held in place by the circlip 32. A seal ring 33 is provided between the outer periphery of the base 31 and the inner periphery of the large-diameter portion 301 to prevent leakage of refrigerant gas along the outer periphery of the base 31.

Three tubular insulators 34U, 34V, 34W made of, for example, a glass are inserted through and fixed to the base 31. Three conductive pins 35U, 35V, 35W as a first conductor are inserted through and fixed to the respective insulators 34U, 34V, 34W. One ends of the conductive pins 35U, 35V, 35W extend radially out of the shell 14 through the insulators 34U, 34V, 34W, and the other ends of the conductive pins 35U, 35V, 35W extend radially inward into the shell 14 through the insulators 34U, 34V, 34W. The ends of the conductive pins 35U, 35V, 35W outside the shell 14 are electrically connected to the inverter 29 (see FIG. 1) through electric wires 36U, 36Y, 36W, respectively.

Referring back to FIG. 1, the coil 23 is composed of a U-phase coil, a V-phase coil and a W-phase coil, each having a lead wire 37 (only one lead wire being shown in the drawing) electrically connected to a terminal 38 to which conductive members 39U, 39V, 39W as a second conductor are electrically connected.

As shown in FIG. 2, each of the conductive members 39U, 39V, 39W is composed of a core 391 and an insulator 392 covering the core 391. The cores 391 of the conductive members 39U, 39V, 39W are connected to connectors 40U, 40V, 40W to which the ends of the conductive pins 35U, 35V, 35W are connected, respectively. The connectors 40U, 40V, 40W are made of a metal. Thus, the cores 391 of the conductive members 39U, 39V, 39W are electrically connected through the connectors 40U, 40V, 40W to the ends of the conductive pins 35U, 35Y, 35W, respectively. The connectors 40U, 40V, 40W are received in a connector case 41.

The conductive pin 35U, the conductive member 39U and the connector 40U serve as a U-phase conductor of the present invention. Similarly, the conductive pin 35V, the conductive member 39V and the connector 40V serve as a V-phase conductor of the present invention and the conductive pin 35W, the conductive member 39W and the connector 40W serve as a W-phase conductor of the present invention. Electric power is supplied from the inverter 29 through the conductive pins 35U, 35V, 35W, the connectors 40U, 40V, 40W and the conductive members 39U, 39V, 39W to the coil 23, respectively, so that the rotor 11 is rotated together with the rotary shaft 12.

Figure 3A:
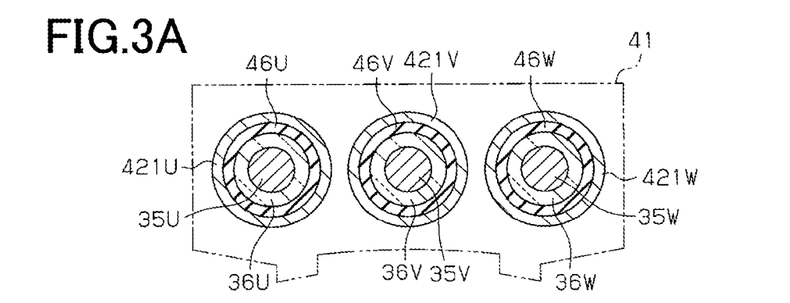
FIG. 3A is a cross-sectional view taken along the line A-A of FIG. 2.
Figure 3B:
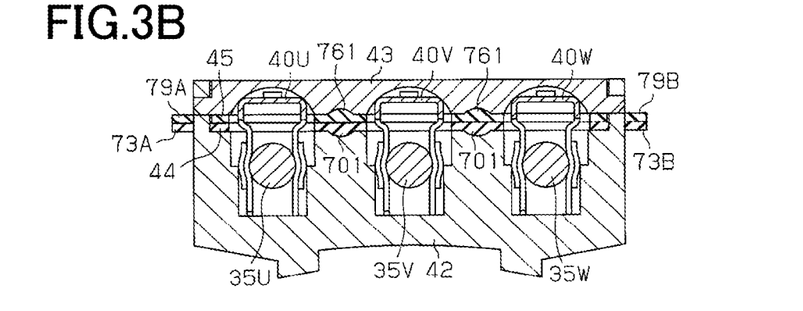
FIG. 3B is a cross-sectional view taken along the line B-B of FIG. 2.
Figure 3C:
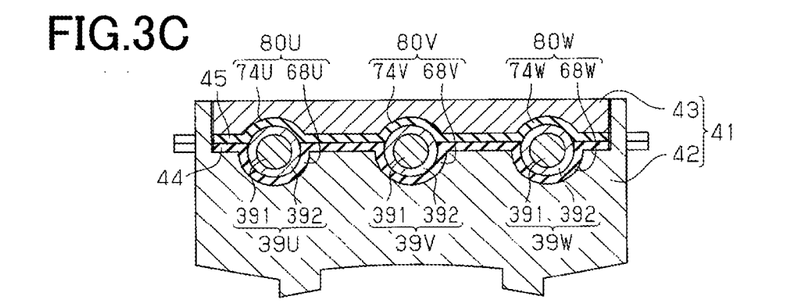
FIG. 3C is a cross-sectional view taken along the line C-C of FIG. 2.

As shown in FIGS. 3B and 3C, the connector case 41 is composed of a first case member 42 and a second case member 43 both of which are made of a resin. First and second seal members 44, 45 both of which are rectangular-shaped and made of a rubber are interposed between the first and the second case members 42, 43. Referring to FIGS. 2, 3A, the first case member 42 is formed integrally therewith cylindrical portions 421U, 421V, 421W through which cylindrical third seal members 46U, 46V, 46W made of a rubber are inserted, respectively. The interior of the third seal members 46U, 46V, 46W communicate with the interior of the connector case 41 and the conductive pins 35U, 35V, 35W are inserted through the third seal members 46U, 46V, 46W, respectively.

Figures 4A, 4B:
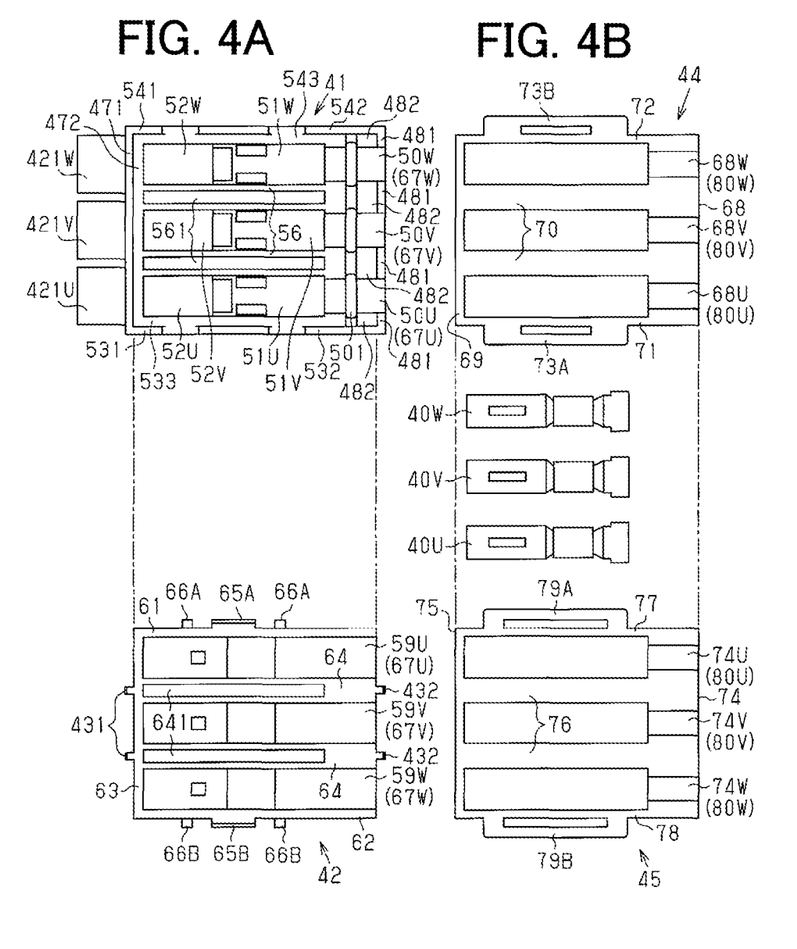
FIG. 4A is an exploded plan view of a connector case.
FIG. 4B is a plan view of a first seal member, a second seal member and connectors.
Figure 5:
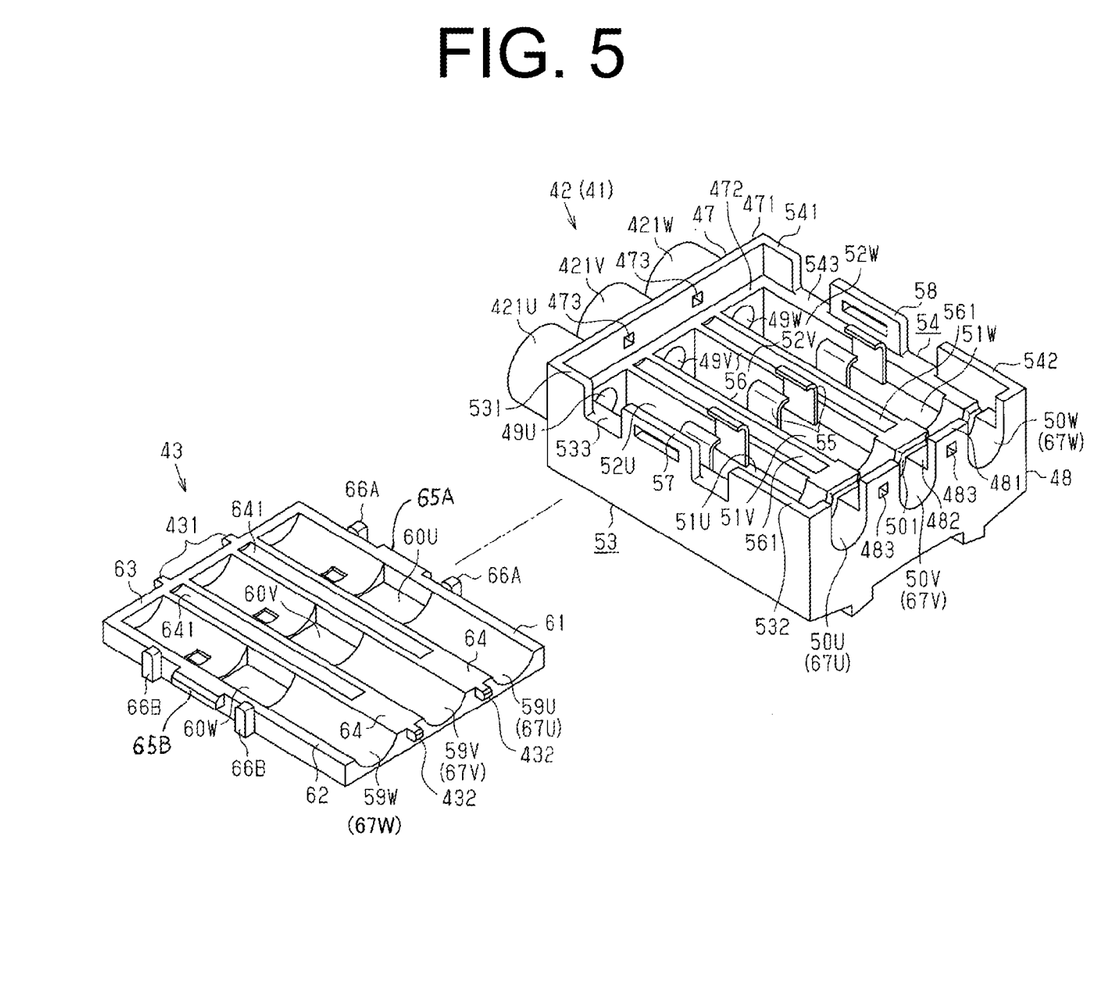
FIG. 5 is an exploded perspective view of the connector case.

FIG. 4A is the exploded plan view of the connector case 41 and FIG. 4B is the plan view of the first seal member 44, the second seal member 45 and the connectors 40U, 40V, 40W. FIG. 5 is the exploded perspective view of the connector case 41.

As shown in FIG. 5, the first case member 42 is of a generally rectangular shape having on one short side 47 thereof a coated wall 471 with a stepped outer seal surface 472 and on the other short side 48 thereof a coated wall 481 with a stepped outer seal surface 482. The first case member 42 also has on one long side 53 thereof coated walls 531, 532 with a stepped outer seal surface 533 and on the other long side 54 thereof coated walls 541, 542 with a stepped outer seal surface 543.

The first case member 42 has formed through the coated wall 477 thereof holes 49U, 49V, 49W and in the bottom thereof third recesses 52U, 52V, 52W communicating with the interiors of the cylindrical portions 421U, 421V, 421W through the holes 49U, 49V, 49W, respectively. The conductive pins 35U, 35V, 35W are inserted through the holes 49U, 49V, 49W, passing axially through the cylindrical portions 421U, 421V, 421W, respectively.

The first case member 42 has formed in the bottom thereof second recesses 51U, 51V, 51W that are continuous with the third recesses 52U, 52V, 52W, respectively. The first case member 42 has also formed in the short side 48 thereof first recesses 50U, 50V, 50W that are continuous with the second recesses 51U, 51V, 51W, respectively, so that the first recesses 50U, 50V, 50W communicate with the holes 49U, 49V, 49W through the second recesses 51U, 51V, 51W and the third recesses 52U, 52V, 52W, respectively. A pair of hooks 55 are formed extending upward from the bottom of each of the second recesses 51U, 51V, 51W.

Three sets of the first, the second and the third recesses, i.e. 50U, 51U and 52U, 50V, 51V and 52V, and 50W, 51W and 52W, are defined by the outer seal surfaces 533, 543 on the respective long sides 53, 54, a pair of inner seal surfaces 56 and the outer seal surfaces 472, 482 on the respective short sides 47, 48. The first case member 42 is formed with catches 57, 58 projecting from the outer seal surfaces 533, 543 of the long sides 53, 54, respectively. First grooves 561 are formed in the respective inner seal surfaces 56 and a third groove 501 is formed in each of the first recesses 50U, 50V, 50W and the inner seal surface 56 so as to extend in a direction perpendicular to the extending direction of the first groove 561.

The second case member 43 is formed in a generally rectangular shape that can be fitted within the coated walls 471, 481, 531, 532, 541, 542 of the first case member 42. The second case member 43 has formed therein fourth recesses 59U, 59V, 59W and fifth recesses 60U, 60V, 60W so that the fourth recesses 59U, 59V, 59W are continuous with the fifth recesses 60U, 60V, 60W, respectively. The connectors 40U, 40V, 40W are fitted in the fourth recesses 59U, 59V, 59W and the fifth recesses 60U, 60V, 60W, respectively.

Three sets of the recesses, i.e. 59U and 60U, 59V and 60V, and 59W and 60W are defined by a pair of outer seal surfaces 61, 62 on the long side of the second case member 43, an outer seal surface 63 on the short side and a pair of inner seal surfaces 64. A second groove 641 is formed in each of the inner seal surfaces 64. Hooks 65A, 65B that are engageable with the catches 57, 58, respectively, are formed projecting horizontally outward from the respective long sides. Additionally, a pair of third projections 66A, 66B are formed projecting upward from each long side of the second case member 43 so as to place the hooks 65A, 65B between the respective pair of the third projections 66A, 66B. The catches 57, 58 and the hooks 65A, 65B correspond to engaging members of the present invention.

Referring to FIG. 5, a plurality of holes 473, 483 are formed through the coated walls 471, 481 of the first case member 42, respectively. A plurality of projections 431, 432 that are engageable with the holes 473, 483, respectively, are formed projecting horizontally outward from the respective short sides of the second case member 43.

Figure 6:
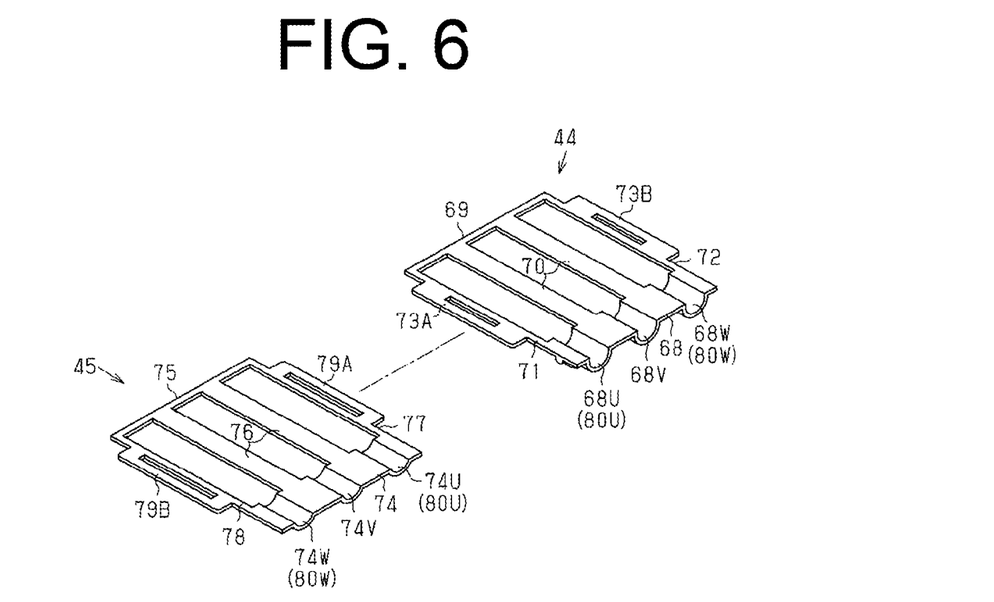
FIG. 6 is a perspective view of the first and the second seal members.

When the second case member 43 is fitted within the coated walls 471, 481, 531, 532, 541, 542 of the first case member 42, the projections 431, 432 are engaged with their corresponding holes 473, 483, and the first recesses 50U, 50V, 50W and the fourth recesses 59U, 59V, 59W face each other thereby to form holes 67U, 67V, 67W, respectively Referring to FIG. 6, the first seal member 44 made of a rubber is formed in a generally rectangular shape so as to be fitted within the coated walls 471, 481, 531, 532, 541, 542 of the first case member 42. The first seal member 44 has at the short sides thereof first and second peripheral seal portions 69, 68 and at the long side thereof first and second side seal portions 71, 72, respectively. The first seal member 44 further has a pair of first partition seal portions 70 formed between the first and the second peripheral seal portions 69, 68 so as to be continuous therewith. The pair of first partition seal portions 70 extend parallel to the first and second side seal portions 71, 72.

Figure 7:
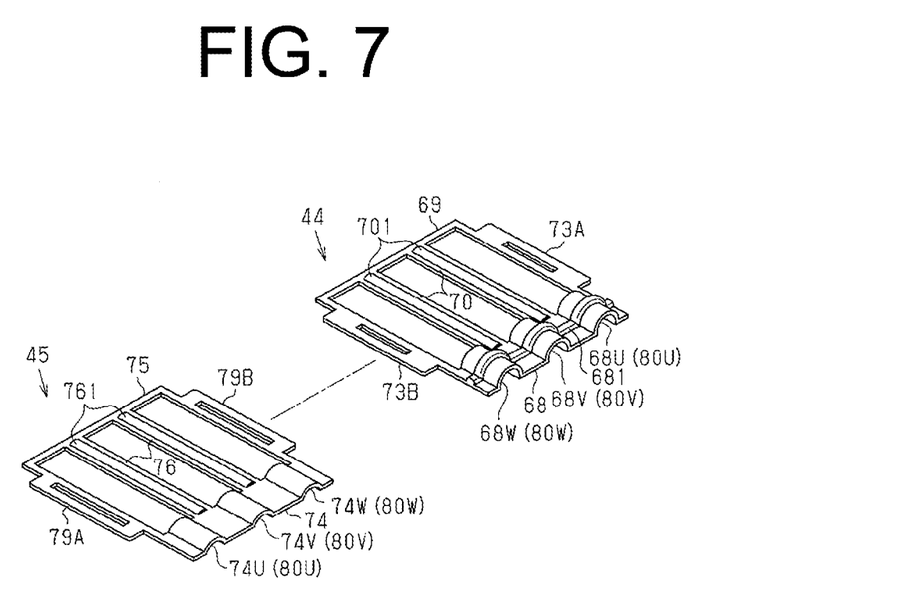
FIG. 7 is another perspective view of the first and the second seal members.

Referring to FIG. 7, the second peripheral seal portion 68 includes three semicircular seal portions 68U, 68V, 68W. A projection 681 is formed projecting from the convex surface (or rear surface) side of each of the semicircular seal portions 68U, 68V, 68W of the first seal member 44 so as to be fittable into the third groove 501 of the first case member 42. The first peripheral seal portion 69 is located opposite from the second peripheral seal portion 68. First and second tabs 73A, 73B are formed projecting horizontally outward from the first and the second side seal portions 71, 72 on the long sides of the first seal member 44 so as to be engageable with the catches 57, 58 of the first case member 42, respectively.

Referring to FIG. 6, the second seal member 45 made of a rubber is formed in a generally rectangular shape so as to be fitted within the coated walls 471, 481, 531, 532, 541, 542 of the first case member 42. The second seal member 45 has at the short sides thereof fourth and third peripheral seal portions 74, 75 and at the long sides thereof third and fourth side seal portions 77, 78, respectively. A pair of second partition seal portions 76 are formed between the fourth and the third peripheral seal portions 74, 75 so as to be continuous therewith. The pair of second partition seal portions 76 extend parallel to the third and the fourth side seal portions 77, 78. The fourth peripheral seal portion 74 has three semicircular seal portions 74U, 74V, 74W. The third peripheral seal portion 75 is located opposite from the fourth peripheral seal portion 74. Third and fourth tabs 79A, 79B are formed projecting horizontally outward from the third and the fourth side seal portions 77, 78 on the long sides of the second seal member 45. The third and the fourth tabs 79A, 79B are engageable with the third projections 66A, 66B of the second case member 43, respectively.

Referring to FIG. 7, a first projection 701 is formed in each first partition seal portion 70 of the first seal member 44 on the rear surface side thereof so as to be engageable with the first groove 561 of the first case member 42. A second projection 761 is formed in each second partition seal portion 76 of the second seal member 45 on the rear surface side thereof so as to be engageable with the second groove 641 of the second case member 43.

The first seal member 44 and the second seal member 45 are joined together in a manner that the concave surfaces of the semicircular seal portions 68U, 68V, 68W as the first semicircular seal portion of the present invention face the concave surfaces of the semicircular seal portions 74U, 74V, 74W as the second semicircular seal portion of the present invention, respectively, and also the paired first partition seal portions 70 face the paired second partition seal portions 76, respectively. With the first seal member 44 and the second seal member 45 thus joined together, the semicircular seal portions 68U, 68V, 68W of the first seal member 44 and the semicircular seal portions 74U, 74V, 74W of the second seal member 45 cooperate to form cylindrical seal portions 80U, 80V, 80W, respectively.

The following will describe a procedure for connecting the conductive pins 35U, 35V, 35W and the conductive members 39U, 39V, 39W to the connectors 40U, 40V, 40W and then mounting the connectors 40U, 40V, 40W in the connector case 41. It is noted that the conductive pins 35U, 35V, 35W are previously inserted through and fixed to the insulators 34U, 34V, 34W, respectively, the insulators 34U, 34V, 34W are also previously inserted through and fixed to the base 31 and also that the first and the second case members 42, 43 are yet to be assembled.

Figure 8A:
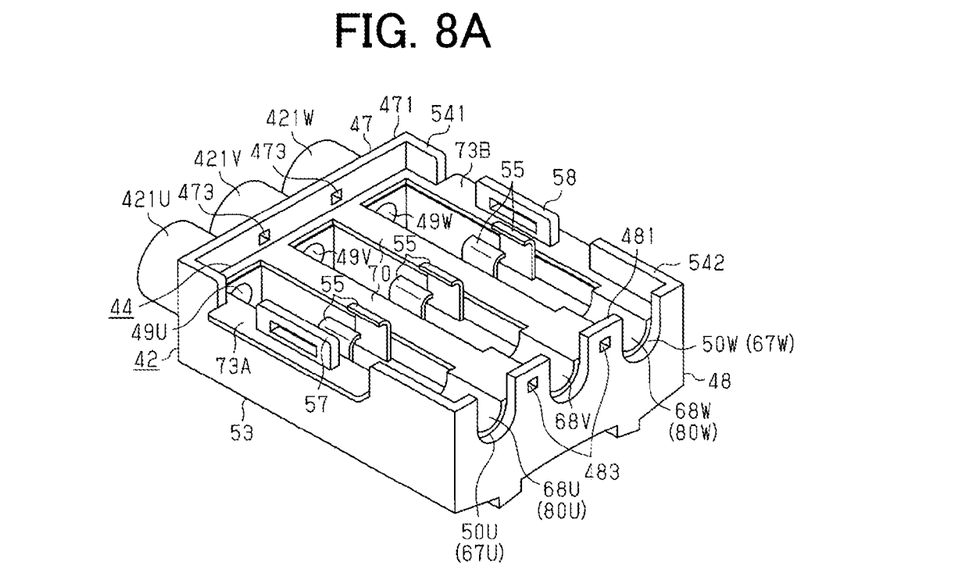
FIG. 8A is a perspective view of a first case member to which the first seal member is mounted.
Figure 8B:
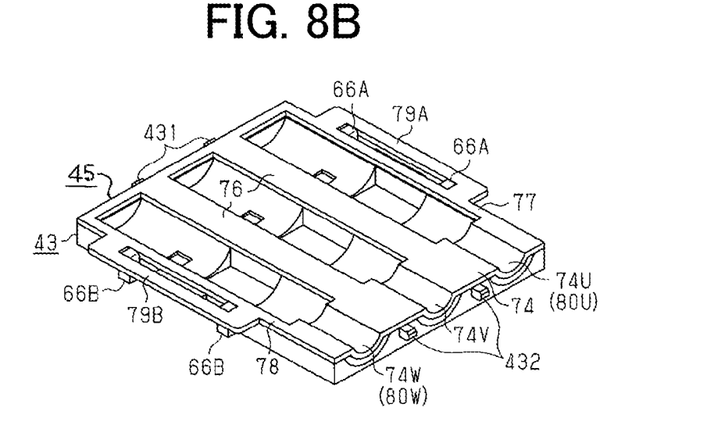
FIG. 8B is a perspective view of a second case member to which the second seal member is mounted.

Firstly, as shown in FIG. 8A, the first seal member 44 is fitted within the coated walls 471, 481, 531, 532, 541, 542. Next, as shown in FIG. 8B, the second seal member 45 is joined to the second case member 43 so as to be in contact with the outer seal surfaces 61, 62, 63, 64 of the second seal member 43. With the first seal member 44 fitted within the coated walls 471, 481, 531, 532, 541, 542 of the first case member 42, the first and the second tabs 73A, 73B of the first seal member 44 are engaged with the catches 57, 58 of the first case member 42, respectively. Additionally, the first projections 701 of the first seal member 44 are engaged with the first grooves 561 of the first case member 42 and the projections 681 of the first seal member 44 are engaged with the third groove 501 of the first case member 42. With the second seal member 45 joined to the second case member 43, the third and the fourth tabs 79A, 79B of the second seal member 45 are engaged with the third projections 66A, 66B of the second case member 43, respectively, and the second projections 761 of the second seal member 45 are engaged with the second grooves 641 of the second case member 43.

Next, the connectors 40U, 40V, 40W connected to the cores 391 of the conductive members 39U, 39V, 39W, respectively, are held between the paired hooks 55 of the first case member 42 so that the insulators 392 contact with the semicircular seal portions 68U, 68V, 68W of the first seal member 44.

Next, the second case member 43 is joined to the first case member 42 so that the second case member 43 is held within the coated walls 471, 481, 531, 532, 541, 542 of the first case member 42 and the hooks 65A, 65B of the second case member 43 are engaged with the catches 57, 58 of the first case member 42. With the hooks 65A, 65B engaged with the catches 57, 58, the insulators 392 are held between the semicircular seal portions 68U, 68V, 68W of the first seal member 44 and between the semicircular seal portions 74U, 74V, 74W of the second seal member 45, respectively.

Next, the cylindrical third seal members 46U, 46V, 46W are inserted into the cylindrical portions 421U, 421V, 421W of the first case member 42, respectively. Subsequently, the insulators 34U, 34V, 34W are inserted into the connector case 41 through the third seal members 46U, 46V, 46W, and the conductive pins 35U, 35V, 35W are inserted into the connectors 40U, 40V, 40W, respectively, for connection thereto. The third seal members 46U, 46V, 46W seal around the insulators 34U, 34V, 34W, respectively.

With the connectors 40U, 40V, 40W accommodated in the connector case 41, the first side seal portion 71 of the first seal member 44 and the third side seal portion 77 of the second seal member 45 are held between the outer seal surface 533 of the first case member 42 and the outer seal surface 61 of the second case member 43. Similarly, the second side seal portion 72 of the first seal member 44 and the fourth side seal portion 78 of the second seal member 45 are held between the outer seal surface 543 of the first case member 42 and the outer seal surface 62 of the second case member 43. The first peripheral seal portion 69 of the first seal member 44 and the peripheral seal portion 75 of the second seal member 45 are held between the outer seal surface 472 of the first case member 42 and the outer seal surface 63 of the second case member 43. The semicircular seal portions 68U, 68V, 68W of the first seal member 44 and the semicircular seal portions 74U, 74V, 74W of the second seal member 45 are held between the first recesses 50U, 50V, 50W of the first case member 42 and the fourth recesses 59U, 59V, 59W of the second case member 43. The first partition seal portions 70 of the first seal member 44 and the second partition seal portions 76 of the second seal member 45 are held between the inner seal surface 56 of the first case member 42 and the inner seal surface 64 of the second case member 43

Therefore, the first and the second seal members 44, 45 seal between the peripheries of the first and the second case members 42, 43 in the connector case 41 and electrically insulate between any two adjacent connectors 40U, 40V, 40W by the first and the second partition seal portions 70, 76.

The outer seal surfaces 472, 482, 533, 543, the first recesses 50U, 50V, 50W and the inner seal surfaces 56 cooperate to form an annular first seal surface extending along the periphery of the first case member 42. The outer seal surfaces 61, 62, 63, the fourth recesses 59U, 59V, 59W and the inner seal surfaces 64 cooperate to form an annular second seal surface extending along the periphery of the second case member 43 and facing the first seal surface.

The first peripheral seal portion 69, the first side seal portion 71, the second side seal portion 72 and the semicircular seal portions 68U, 68V, 68W cooperate to form a first main seal that is joined to the first seal surface of the first case member 42. The peripheral seal portion 75, the third side seal portion 77, the fourth side seal portion 78 and the semicircular seal portions 74U, 74V, 74W cooperate to form a second main seal that is joined to the second seal surface of the second case member 43.

The motor-driven compressor according to the first embodiment of the present invention offers the following advantageous effects.

(1) The first and the second seal members 44, 45 seal between the peripheries of the first case member 42 and the second case member 43, thereby preventing the ingress of liquid refrigerant into the connector case 41. The third seal members 46U, 46V, 46W seal between the conductive pins 35U, 35V, 35W and the connector case 41, respectively. The provision of the first, the second and the third seal members 44, 45, 46U, 46V, 46W improves sealing of the connector case 41.

Specifically, the sealing of the connector case 41 is accomplished by a simple structure wherein the first and the second case members 42, 43 are joined together with the first and the second seal members 44, 45 interposed therebetween and also the third seal members 46U, 46V, 46W are fitted in the cylindrical portions 421U, 421V, 421W of the first case member 42, respectively. The sealing of the connection (or the connecters 40U, 40V, 40W) between the conductive members 39U, 39V, 39W and the conductive pins 35U, 35V, 35W can be improved by such a simple structure.

(2) Any two adjacent connectors 40U, 40V, 40W are electrically blocked by the first and the second partition seal portions 70, 76. Thus, electrical insulation between the connecters 40U, 40V, 40W and hence prevention of electrical leakage between the connecters 40U, 40V, 40W can be accomplished.

(3) The first and the second seal members 44, 45 which are formed separately can be made easily.

(4) The use of a rubber as the material for the first and the second seal members 44, 45 increases their elastic deformation, thereby helping to improve the sealing between the first and the second case members 42, 43.

(5) The structure in which the first projections 701 are engaged with the first grooves 561 and the second projections 761 are engaged with the second grooves 641 provides enhanced sealing performance of the first and the second partition seal portions 70, 76, respectively, thereby improving the electrical insulation between any two adjacent connectors 40U, 40V, 40W. Such structure also helps to position the first and the second seal members 44, 45 precisely relative to the connector case 41.

Figure 9:
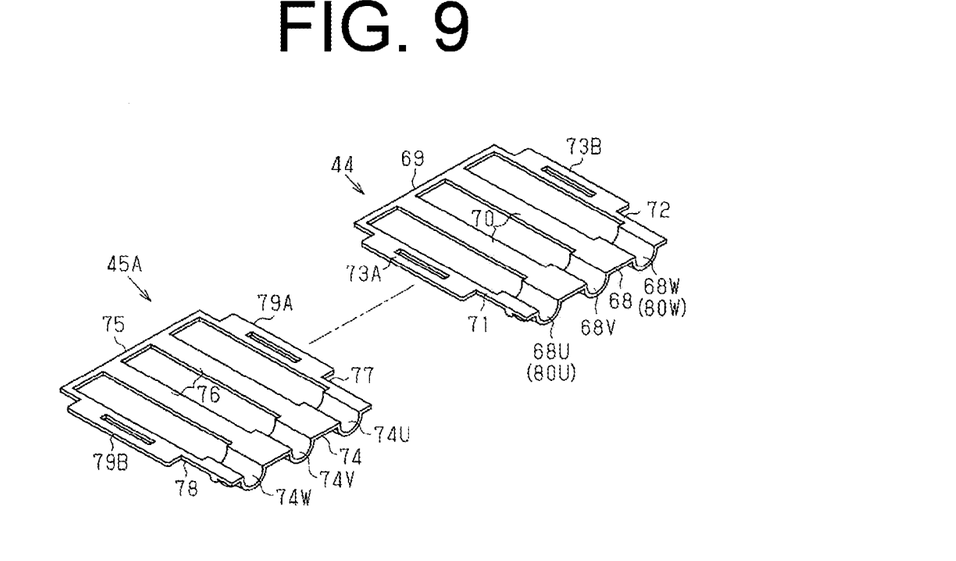
FIG. 9 is a perspective view of another embodiment of the first and the second seal members.

Referring to FIG. 9, the second seal member 45A may be made of substantially the same shape as the first seal member 44. The use of such common components for the first and the second seal members 44, 45 helps to reduce the manufacturing cost.

Figure 10:
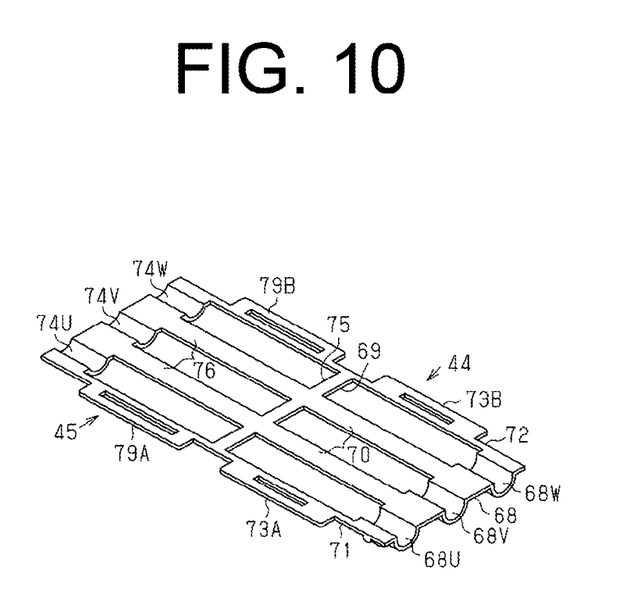
FIG. 10 is a perspective view of still another embodiment of the seal member.

Referring to FIG. 10, the first and the second seal members 44, 45 may be formed integrally as a single structure so that the first peripheral seal portion 69 of the first seal member 44 is connected directly to the third peripheral seal portion 75 of the second seal member 45.

Figure 11:
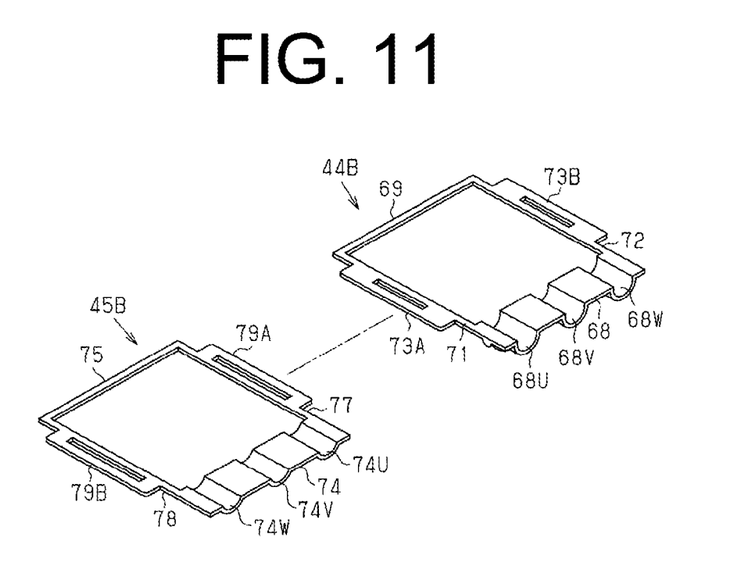
FIG. 11 is a perspective view of yet another embodiment of the first and the second seal members.

Referring to FIG. 11, the first and the second seal members 44, 45 may dispense with the first and the second partition seal portions 70, 76 as used in the preferred first preferred embodiment, respectively. This structure offers the same advantageous effects as described in (1) and (4) of the first embodiment.

A flexible synthetic resin may be used as the material for the first, the second and the third seal members 44, 45, 46U, 46V, 46W.

What is claimed is:

1. A motor-driven compressor, comprising:
   a shell provided with a base;
   an insulator fixed to the base;
   an electric motor provided in the shell;
   a first conductor extended through the shell and electrically connected to an external power source, the first conductor inserted through and fixed to the insulator fixed to the base;
   a second conductor electrically connected to the electric motor;
   a connector connecting the first conductor and the second conductor; and
   a connector case made of resin, configured to receive the connector,
   wherein the connector case includes:
   a first case member including a first seal surface extending along a periphery of the first case member and including a cylindrical portion formed integrally therewith;
   a second case member including a second seal surface extending along a periphery of the second case member and facing the first seal surface;
   a first seal member interposed between the first and second case members and having a first main seal that is joined to the first seal surface;
   a second seal member interposed between the first and second case members and having a second main seal that is joined to the second seal surface;
   a hole through which the first conductor is inserted; and
   a third seal member insert fitted in the cylindrical portion of the first case member in the connector case, so as to directly contact an inner surface of the cylindrical portion, and the third seal member interposed between an outer surface of the insulator and the inner surface of the cylindrical portion so as to form a seal between the insulator and cylindrical portion of the connector case, wherein the first main seal and the second main seal cooperate to form a cylindrical seal portion for sealing the second conductor that is inserted through the cylindrical seal portion when the first and the second seal members are joined, and wherein the cylindrical portion of the first case member of the connector case contacts the base, and
   wherein the connector case, the insulator, the first seal member, the second seal member and the third seal member are housed in the shell.

2. The motor-driven compressor according to claim 1, wherein the motor-driven compressor includes a plurality of sets of the connector, the first conductor and the second conductor, wherein the first seal member further includes:
   a first partition seal portion continuous with the first main seal and electrically insulating between any two adjacent connectors in the connector case, wherein the second seal member further includes:
   a second partition seal portion continuous with the second main seal and electrically insulating between any two adjacent connectors in the connector case.

3. The motor-driven compressor according to claim 2, wherein the first partition seal portion includes:
   a first projection formed in the first partition seal portion, wherein the second partition seal portion includes:
   a second projection formed in the second partition seal portion, wherein the first case member further includes:
   a first groove formed in the first seal surface and engageable with the first projection, wherein the second case member further includes:
   a second groove formed in the second seal surface and engageable with the second projection.

4. The motor-driven compressor according to claim 1, wherein the hole is formed in the first case member.

5. The motor-driven compressor according to claim 1, wherein the first main seal further includes:
   a first peripheral seal portion on one side of the first seal member and opposite from the cylindrical seal portion;
   a second peripheral seal portion that is opposite from the first peripheral seal portion and forms a part of the cylindrical seal portion;
   a first side seal portion connecting one end of the first peripheral seal portion and one end of the second peripheral seal portion; and
   a second side seal portion connecting the other end of the first peripheral seal portion and the other end of the second peripheral seal portion, wherein the second main seal further includes:
   a third peripheral seal portion on one side of the second seal member and opposite from the cylindrical seal portion;
   a fourth peripheral seal portion that is opposite from the third peripheral seal portion and forms a part of the cylindrical seal portion;
   a third side seal portion connecting one end of the third peripheral seal portion and one end of the fourth peripheral seal portion; and
   a fourth side seal portion connecting the other end of the third peripheral seal portion and the other end of the fourth peripheral seal portion.

6. The motor-driven compressor according to claim 5, wherein each of the first case member and the second case member further includes:
   an engaging member, wherein the engaging member of the first case member is engageable with the engaging member of the second case member when the second case member is joined to the first case member, wherein one of the first case member and the second case member further includes:
   a pair of third projections provided so as to place the engaging member of the one of the first case member and the second case member between the pair of third projections, wherein the first side seal portion further includes:
   a first tab that is engageable with the engaging member or the pair of third projections; wherein the second side seal portion further includes:
   a second tab that is engageable with the engaging member or the pair of third projections; wherein the third side seal portion further includes:
   a third tab that is engageable with the engaging member or the pair of third projections; wherein the fourth side seal portion further includes:
   a fourth tab that is engageable with the engaging member or the pair of third projections.

7. The motor-driven compressor according to claim 1, wherein the first seal member and the second seal member are provided separately.

8. The motor-driven compressor according to claim 1, wherein the second seal member is made of substantially the same shape as the first seal member.

9. The motor-driven compressor according to claim 5, wherein the first seal member and the second seal member are formed integrally as a single structure so that the first peripheral seal portion is connected directly to the third peripheral seal portion.

10. The motor-driven compressor according to claim 1, wherein the first seal member, the second seal member and the third seal member are made of a rubber.

* * * * *